United States Patent
Wohrle et al.

(10) Patent No.: US 8,848,807 B2
(45) Date of Patent: Sep. 30, 2014

(54) APPARATUS FOR TRANSMISSION OF ELECTRICAL ENERGY AND INFORMATION

(75) Inventors: Markus Wohrle, Eisenberg (DE); Michael Warnking, Sonthofen (DE)

(73) Assignee: Endress + Hauser Wetzer GmbH + Co. KG, Nesselwang (DE)

( * ) Notice: Subject to any disclaimer, the term of this patent is extended or adjusted under 35 U.S.C. 154(b) by 420 days.

(21) Appl. No.: 12/735,076

(22) PCT Filed: Dec. 9, 2008

(86) PCT No.: PCT/EP2008/067053
§ 371 (c)(1),
(2), (4) Date: Jun. 14, 2010

(87) PCT Pub. No.: WO2009/074545
PCT Pub. Date: Jun. 18, 2009

(65) Prior Publication Data
US 2010/0254465 A1 Oct. 7, 2010

(30) Foreign Application Priority Data
Dec. 13, 2007 (DE) .......................... 10 2007 060 555

(51) Int. Cl.
*H04B 3/00* (2006.01)
*G01D 21/00* (2006.01)
(52) U.S. Cl.
CPC ...................... *G01D 21/00* (2013.01)
USPC ............ 375/258; 375/220; 375/222; 375/221
(58) Field of Classification Search
USPC .................. 375/258, 220, 222, 221
See application file for complete search history.

(56) References Cited

U.S. PATENT DOCUMENTS

| | | | |
|---|---|---|---|
| 4,901,215 A * | 2/1990 | Martin-Lopez | 363/21.05 |
| 5,105,190 A | 4/1992 | Kip | |
| 5,345,231 A | 9/1994 | Koo | |
| 2008/0151973 A1* | 6/2008 | Calvin | 375/216 |
| 2008/0267301 A1* | 10/2008 | Alfano et al. | 375/258 |

FOREIGN PATENT DOCUMENTS

| | | |
|---|---|---|
| CN | 2231470 | 7/1996 |
| DE | 199 49 649 A1 | 6/2000 |
| EP | 0 768 540 A1 | 4/1997 |
| EP | 1 385 251 A1 | 1/2004 |
| EP | 1 748 334 B1 | 1/2007 |
| GB | 2 251 947 A | 7/1992 |
| WO | 02/41086 A3 | 5/2002 |

* cited by examiner

*Primary Examiner* — Kabir A Timory
(74) *Attorney, Agent, or Firm* — Bacon & Thomas, PLLC

(57) ABSTRACT

An apparatus for transmission of electrical energy and data between a primary side and a secondary side. At least one transferring unit is provided between the primary side and the secondary side, that, on the secondary side, at least a first data channel is provided, which has at least one address, that, on the primary side, at least one frequency control unit is provided, which is embodied in such a manner that the frequency control unit sets the working frequency of the transferring unit corresponding to data to be transferred and/or corresponding to the addressing of at least the first data channel, that, on the secondary side, at least one load setting unit is provided, which is embodied in such a manner that the load setting unit sets the electrical load, which lies on the secondary side on the transferring unit, corresponding to data to be transferred and/or corresponding to the address at least of the first data channel.

12 Claims, 2 Drawing Sheets

APPARATUS FOR TRANSMISSION OF ELECTRICAL ENERGY AND INFORMATION

TECHNICAL FIELD

The invention relates to an apparatus for transmission of electrical energy and data between a primary side and a secondary side, i.e., an explosion endangered region and a non-explosive endangered region.

BACKGROUND DISCUSSION

In modern process, and automation, technology, a number of measuring devices, or data logging devices, are used, in order to monitor, to control, processes or to log events. If the medium or the process to be monitored is located in an explosion endangered region, then, most often, galvanic isolation is required, through which, nevertheless, energy and information, or data, must be able to be transferred to the field devices located in the explosion endangered region.

In the state of the art, already a number of options are known for this; see e.g. German Patent DE 2 321 900, European Patent EP 0 977 406 A1 or European Patent EP 0 927 982 B1. These are, however, very complicated and costly. Another option is to transfer the required energy via a transformer and the data via optocoupler, wherein, on each side of the galvanic isolation, a corresponding unit is used, in order to enable bidirectional data transmission. Such a "safe isolation" is very consuming of space and, because of the increased component requirements, also expensive.

Frequently, it occurs that, in the actual explosion endangered process, a larger number of measuring devices, or field devices, are present, which must be correspondingly supplied with energy, or with which communications must be conducted. If each field device needs its own energy supply, or communication, device, then this likewise is connected with costs and consumption of space.

SUMMARY OF THE INVENTION

An object of the invention is to provide galvanic isolation between an explosion endangered zone and a non-explosion endangered zone, through which information and energy can be transferred and which additionally permits the connection of a plurality of field devices on the secondary side.

The invention achieves this object by the features that at least one transferring unit is provided between the primary side and the secondary side, that, on the secondary side, at least a first data channel is provided, which has at least one address, that, on the primary side, at least one frequency control unit is provided, which is embodied in such a manner that the frequency control unit sets the working frequency of the transferring unit corresponding to data to be transferred and/or corresponding to the addressing of at least the first data channel, that, on the secondary side, at least one load setting unit is provided, which is embodied in such a manner that the load setting unit sets the electrical load, which lies on the secondary side on the transferring unit, corresponding to data to be transferred and/or corresponding to the address at least of the first data channel.

An idea of the invention is, thus, that information is transmitted from the primary side to the secondary side via modulation of the working frequency and that, from the secondary side to the primary side, a load change serves for transmission of the data. For the connection of a plurality of channels—thus, connection of a plurality of field devices, or components of field devices—an addressing is provided. Via the addressing, an opportunity is provided for accessing, with targeting, individual channels, or for obtaining on the primary side information concerning from which data channel the information comes. I.e., via the addressing, or the address, as the case may be, a unique associating of the data/information and the source, or the receiver, is given.

An embodiment provides that, on the secondary side, at least a first data channel and at least a second data channel are present, each of which has at least one address of its own. Via a number of data channels, thus, a number of field devices can be connected to one interface, wherein, via their addresses, a safer associating of the data is possible.

An embodiment includes that the first data channel and the second data channel are embodied in such a manner that the first data channel and the second data channel are galvanically isolated from one another. Preferably, the transferring unit provides galvanic isolation between the primary, and the secondary, side. In this embodiment, furthermore, at least two data channels on the secondary side are galvanically isolated from one another. The same is true for other data channels.

An embodiment provides that the frequency control unit is embodied in such a manner that the frequency control unit sets the working frequency of the transferring unit corresponding to data to be transferred and/or corresponding to the address of the data channel or the addresses of the data channels, for which the data are intended, that the load setting unit is embodied in such a manner that the load setting unit sets the electrical load, which lies on the secondary side on the transferring unit, corresponding to data to be transferred and/or corresponding to the address of the data channel or the addresses of the data channels, from which the data originates. In this embodiment, thus, a number of data channels are provided on the secondary side, which serve, for example, for energy supply of, or communication with, correspondingly many field devices. In the data communication, in each case, preferably the address of the data channel is transmitted, for which the data are intended, or from which the data come. In an embodiment, it can also be provided, that transmission of the address is omitted, when, for example, generally valid statements are involved. In this embodiment, thus, it is especially provided, that there is, on the primary side, only one connection, which permits, equally as well, the energy supply of, or the communication with, at least two units on the secondary side.

An embodiment includes that at least the first data channel is embodied in such a manner that the first data channel transmits data via the transferring unit only after a preceding addressing of the primary side via the transferring unit. Especially in reference to the load change, it is required, in order to avoid ambiguities, that not all data channels transmit simultaneously, or simultaneously change the load. This is here prevented by the feature that only that data channel sends, i.e. transmits data, which previously has been addressed by the primary side. In other words: Only that data channel, to which a query has been directed, reports and gives a response.

An embodiment provides that the transferring unit is embodied in such a manner that the transferring unit effects a galvanic isolation between the primary side and the secondary side.

An embodiment includes that the load control unit is embodied in such a manner that the load control unit effects for transmission of data and/or addresses a steep edged and/or short time change of the load.

An embodiment provides that the transferring unit includes at least one transformer.

An embodiment includes that the data to be transferred includes at least measured values and/or measurement parameters.

An embodiment provides that at least the first data channel and/or the second data channel has at least one energy storer. The energy storer serves, in such case, preferably, for storing electrical energy and is, in the simplest case, at least partially, a capacitor. Since communication from the secondary side to the primary side is performed via modulation of the load, this embodiment takes into consideration that the field device connected with the particular data channel can bring about a load change. This load change results, however, from the operating of the field device and should not be interpreted as information to be transferred from the primary side. The energy storer, thus, intercepts possible load changes of the field devices.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
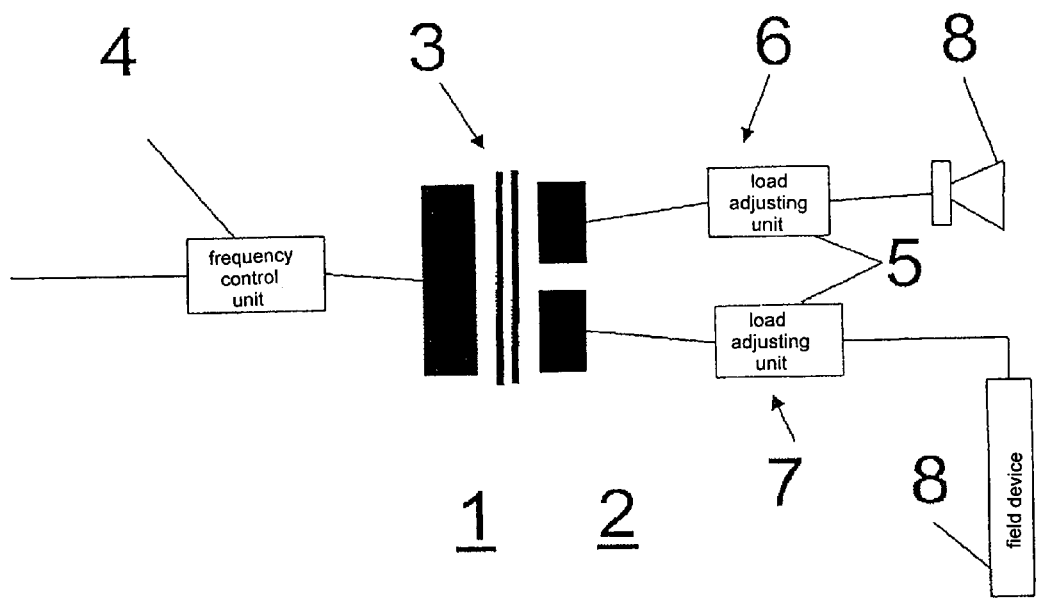
FIG. 1 is a schematic representation of the apparatus of the invention.

FIG. 1 shows schematically the construction of the invention, via which a digital, bidirectional data stream (e.g. for parametering, or read-out of the measurement channels) is possible via a single, galvanically separated interface. A transferring unit 3 is located here between a primary side 1 and a secondary side 2. The two sides can, in such case, differ as to whether they are, for example, explosion endangered. The primary side 1 is here, for example, the side, which is not explosion endangered. On this side is located, thus, for example, an energy source and/or a control station and/or a similar control system, or a parametering input system. Thus, generally, primary side 1 is not the side, which has the actual process, and is not the region, in which the process to be monitored, or to be measured, is located. The process is located, in such case, on the secondary side 2.

On the secondary side 2 can be placed, for example, two different sensors (e.g. a fill level measuring device according to the radar principle and a temperature sensor) as examples of field devices 8, which must be supplied with energy. This energy supply is, in such case, performed via the transferring unit 3. Furthermore, however, also information, or data, traffic must take place. This is required, for example, in order that the individual measuring devices on the secondary side 2 can transmit their measured values, or therefrom derived variables, to the primary side 1, thus, for example, to the control room. Conversely, it is required that, in given cases, measurement parameters or other values are transmitted from the primary side 1 to the secondary side 2 for controlling the measurements. In such case, it is especially required that galvanic isolation be present between the primary side 1 and the secondary side 2. This galvanic isolation is furnished here by a transformer 3.

Data transmission from the primary side 1 to the secondary side 2 takes place by the feature that a frequency control unit 4 correspondingly provided on the primary side 1 changes the working frequency of the transformer 3 corresponding to the information to be transferred (FSK, Frequency Shift Keying).

Thus, for example, two different frequency regions can be used, one for logical 1, and the other for logical 0. Depending on complexity of the plant, however, also other information can be transferred.

The data transmission from the secondary side 2 to the primary side 1 is accomplished by short-time variation of the load on the secondary side 2. I.e., on the primary side 1, it is detected that an increased electrical current requirement is present. This load change is detected on the primary side 1 and likewise correspondingly converted into logical signals.

On the secondary side 2 are two different data channels 6, 7, which, for example, are provided for connection with the two different measuring systems. In alternative embodiments, more than two, or less than two, data channels are provided. In order that the data can be associated with the individual data channels, for example, before each data transmission, the address of the pertinent, or accessed, or sending channel is transmitted. Thus, from the primary side 1 to the secondary side 2, the address of that data channel is transmitted, for which the data/information are intended. Conversely, in the case of transmission from the secondary side 2 to the primary side 1, always the address of that channel is transmitted, which is sending the information. In an additional variant, in given cases, transfer of the address is omitted, when information is involved, which can come from a plurality of data channels, or which are, in effect, general statements concerning the system, or in the case, in which information from the primary side 1 to the secondary side 2 is to be transmitted on a number of channels simultaneously. In addition to the galvanic isolation between the primary side 1 and the secondary side 2, there is, preferably, also galvanic isolation between the two data channels 6, 7.

In order that several channels 6, 7 do not simultaneously undergo a load change, it is provided in an embodiment, that only that data channel is permitted to send, which previously has received from the primary side 1 a corresponding polling signal or which has been addressed in some other way from the primary side 1. Thus, a master, slave architecture is provided, which, in each instance, selects a channel for sending.

Figure 2:
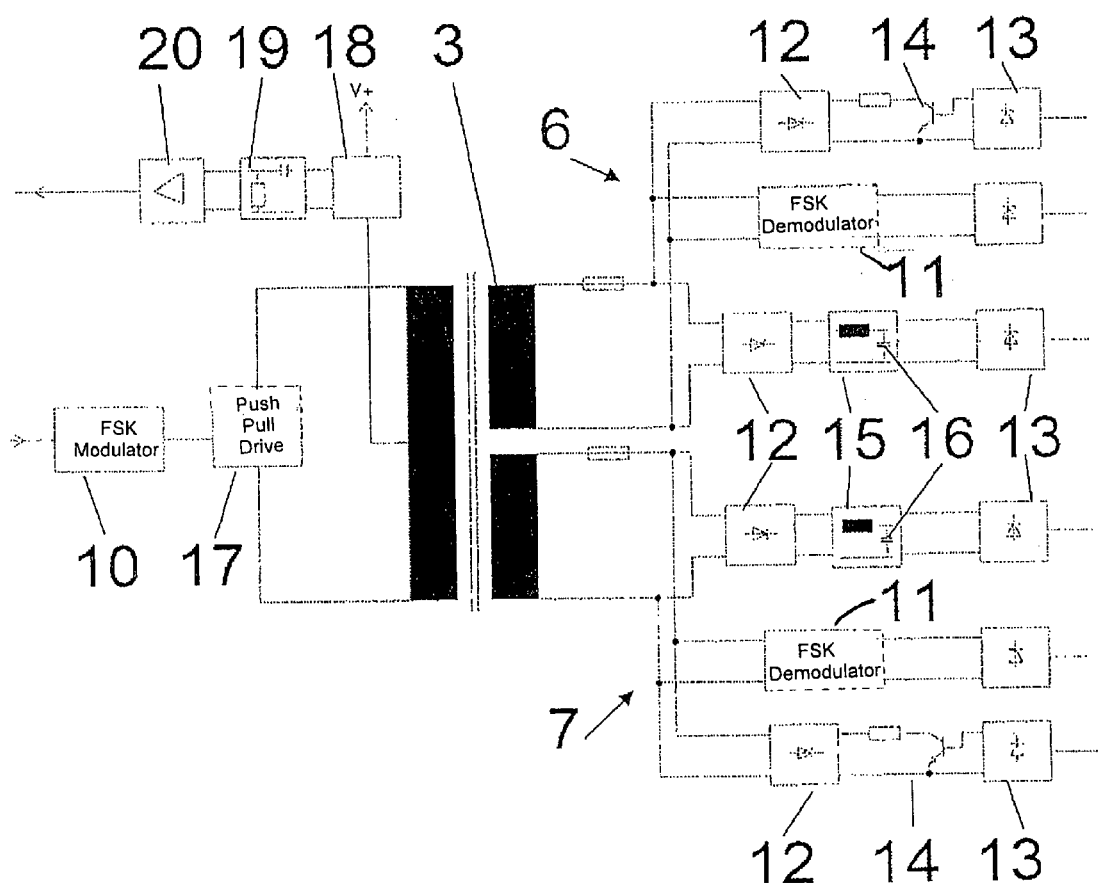
FIG. 2 is a detailed embodiment of an apparatus of the invention.

FIG. 2 shows some details of the construction of the invention. For data transmission from the primary side 1 to the secondary side 2, in such case, an FSK modulator 10 and a push pull driver 17 are provided. The two permit modulation of the working frequency of the transferring unit 3, in order to impress on this the desired information, or data. The transmitted data are then filtered back out on the secondary side 2 by an FSK demodulator 11 and made available to the corresponding device of the associated data channel 6, 7 as a serial data stream.

The data transmission from the secondary side 2 to the primary side 1 happens here by the feature that, by a switch in the corresponding data channel, an additional load 14 is switched, which brings about a short time load increase on the secondary side of the transformer 3. On the primary side 1, in turn, the electrical current is tapped, or measured, by an electrical current sensor 18 and fed via a differentiating member 19 and a signal former 20, which produces from the short pulses of the differentiating member 19 a serial data stream, for example, to an evaluation unit, which correspondingly filters out from this load change the information, or the data, to be transferred or the address of the data channel, from which the data came. In order to avoid, that a load change of the field device 8 connected with the respective data channel 6, 7 is understood as information to be transferred or as an address on the primary side 1, here each data channel 6, 7 is provided with an energy storer 16, which provides a buffering of the energy required by the field device 8. In the illustrated case, such is, in each case, a capacitor, which is, here, part of the filter unit 15.

The data transmission is, in an embodiment, first, the information concerning the address of the data channel 6, 7, from which the data originates, or for which the data are intended, and then the actual data follows. For the transmission, also a corresponding protocol is used, which, in an embodiment, provides transmission of the address, i.e. data and address are transmitted, in an embodiment, always in one packet. The sequence of address and information can then be any sequence provided in the protocol.

The apparatus of the invention is, in such case, implemented, for example, within a device. In an embodiment, it is placed on a circuit board. Or, it is provided in the form of a special device, which serves as an interface for connection between two zones, or between two sides.

The invention claimed is:

1. An apparatus for the transmission of electrical energy and data between a primary side and a secondary side, comprising:
   at least one transferring unit provided between the primary side and the secondary side;
   at least one first data channel and at least a second data channel on the secondary side, each of which has at least one address of its own;
   at least one frequency control unit on the primary side, which is embodied in such a manner that said frequency control unit sets a working frequency of said at least one transferring unit corresponding to data to be transferred and corresponding to addressing of said at least one first data channel and said at least one second data channel respectively; and
   at least one load setting unit on the secondary side, which is embodied in such a manner that said at least one load setting unit sets the electrical load, which lies on the secondary side on said at least one transferring unit, corresponding to data to be transferred and corresponding to the address of said at least one first data channel and at least one second data channel respectively;
   wherein in the data communication the address of the data channel for which the data are intended or from which the data come is transmitted between the primary side and the secondary side; and
   wherein said at least one first data channel is embodied in such a manner that it transmits data via said at least one transferring unit only after a preceding addressing from the primary side via said at least one transferring unit.

2. The apparatus as claimed in claim 1, wherein:
   said at least the first data channel and said at least the second data channel are embodied in such a manner that said at least the first data channel and said at least the second data channel are galvanically isolated from one another.

3. The apparatus as claimed in claim 1, wherein:
   said frequency control unit is embodied in such a manner that it sets the working frequency of said at least one transferring unit corresponding to data to be transferred and/or corresponding to the address of said at least the first data channel and said at least the second data channel, or the addresses of said at least the first data channels, and said at least the second data channel for which data are intended; and
   said at least one load setting unit is embodied in such a manner that it sets the electrical load, which lies on the secondary side on said at least one transferring unit, corresponding to data to be transferred and/or corresponding to the address of said at least the first data channel and said at least the second data channel, or the addresses of said at least the first data channel and said at least the second data channel, from which data originates.

4. The apparatus as claimed in claim 1, wherein:
   said at least one transferring unit is embodied in such a manner that it effects galvanic isolation between the primary side and the secondary side.

5. The apparatus as claimed in claim 1, wherein:
   said at least one load control unit is embodied in such a manner that it
   performs, for transmission of data and/or addresses, a steep edged and/or short time change of the load.

6. The apparatus as claimed in claim 1, wherein:
   said at least one transferring unit includes at least one transformer.

7. The apparatus as claimed in claim 1, wherein:
   data to be transferred at least includes measured values and/or measurement parameters.

8. The apparatus as claimed in claim 1, wherein:
   said at least the first data channel and/or said at least one second data channel has at least one energy storer.

9. The apparatus claimed in claim 1, wherein said first data channel and said second data channel do not simultaneously change the load for transmitting said data in reference to the load change.

10. The apparatus claimed in claim 9, wherein said first data channel and said second data channel are embodied in such a manner that said first data channel and said second data channels are galvanically isolated from one another.

11. The apparatus claimed in claim 1, wherein said first data channel and said second data channel serve for the connection of a plurality of field devices, or components of field devices, by way of the addressing.

12. An apparatus for the transmission of electrical energy and data between a primary side and a secondary side, comprising:
   at least one transferring unit provided between the primary side and the secondary side,
   at least a first data channel and at least a second data channel on the secondary side, each of which has at least one address of its own,
   at least one frequency control unit on the primary side, which is embodied in such a manner that the frequency control unit sets working frequency of said at least one transferring unit corresponding to data to be transferred and corresponding to addressing of said at least one first data channel and said at least one second data channel respectively, and
   at least one load setting unit on the secondary side, which is embodied in such a manner that said at least one load setting unit sets the electrical load, which lies on the secondary side on said at least one transferring unit, corresponding to data to be transferred and corresponding to the address of said at least one first data channel and at least one second data channel respectively,
   wherein the transmission of the address between the primary side and the secondary side is omitted when generally valid statements are involved, which are designated for the first and the second channels; and
   wherein said at least a first data channel is embodied in such a manner that it transmits data via said at least one transferring unit only after a preceding addressing from the primary side via said at least one transferring unit.

* * * * *